Dec. 29, 1925.  1,567,919
H. A. CUMFER
SHEET CUTTING MACHINE
Filed May 15, 1922     6 Sheets-Sheet 1

Inventor:
Harry A. Cumfer.
By Foree Bain Hinkle
Atty.

Dec. 29, 1925.

H. A. CUMFER

SHEET CUTTING MACHINE

Filed May 15, 1922

Inventor:
Harry A. Cumfer
By Jones Rai Hinkle
Attys.

Dec. 29, 1925.

H. A. CUMFER

SHEET CUTTING MACHINE

Filed May 15, 1922 6 Sheets-Sheet 4

Inventor:
Harry A. Cumfer

Dec. 29, 1925.  
H. A. CUMFER  
1,567,919  
SHEET CUTTING MACHINE  
Filed May 15, 1922    6 Sheets-Sheet 5

Dec. 29, 1925.

H. A. CUMFER

SHEET CUTTING MACHINE

Filed May 15, 1922    6 Sheets-Sheet 6

Inventor:
Harry A. Cumfer
By Jonée Bain Hinkle
Attys.

Patented Dec. 29, 1925.

1,567,919

UNITED STATES PATENT OFFICE.

HARRY A. CUMFER, OF CHICAGO, ILLINOIS, ASSIGNOR TO GUYTON & CUMFER MFG. CO., A CORPORATION OF ILLINOIS.

SHEET-CUTTING MACHINE.

Application filed May 15, 1922. Serial No. 561,234.

*To all whom it may concern:*

Be it known that I, HARRY A. CUMFER, a citizen of the United States, residing at Chicago, in the county of Cook and State of Illinois, have invented certain new and useful Improvements in Sheet-Cutting Machines, of which the following is a specification.

This invention relates to sheet cutting machines.

One of the objects of the invention is to provide an improved sheet cutting machine and controlling mechanism therefor, whereby a sheet, while in constant movement thru the machine, may be severed into a plurality of sections of equal length without stopping the general progress of the sheet.

A further object is to provide a sheet cutting machine in which the knife-operating mechanism is controlled by a sheet measuring means, which means may be driven by a source of power which does not operate the knife.

A further object is to provide a presser foot to momentarily engage the sheet to hold it firmly while the knife is severing it and which is quickly retracted after the severing operation.

Another object is to provide a shock absorber for the knife moving mechanism to reduce the strain which would otherwise be imposed upon the said mechanism by the sudden application of power thereto.

A further object is, generally, to improve machines of this character, to render them more stable, accurate, efficient and reliable in operation.

Other objects and advantages will hereinafter appear from a consideration of the following description when taken in conjunction with the drawings, wherein:—

Fig. 2 is an end elevation of the machine.

Fig. 8 is a section taken on line 8—8 of Fig. 4.

In all the views the same reference characters are employed to indicate similar parts.

The machine is especially desirable for use with other machines in making building board.

20—20 are the two spaced apart members of the sub-frame held together by the rods 21. A superimposed frame, consists of the members 22, upon which are mounted at each end pedestals 23 connected to the sub-frame below. A power shaft 24 is suitably mounted in the attachable frame members 20'—20' and is driven by a pulley 25 in the form of a fly wheel, which is normally loosely rotatable upon the shaft 24 and is connectible thereto periodically by a positive clutch means to be hereafter described.

Figure 1:
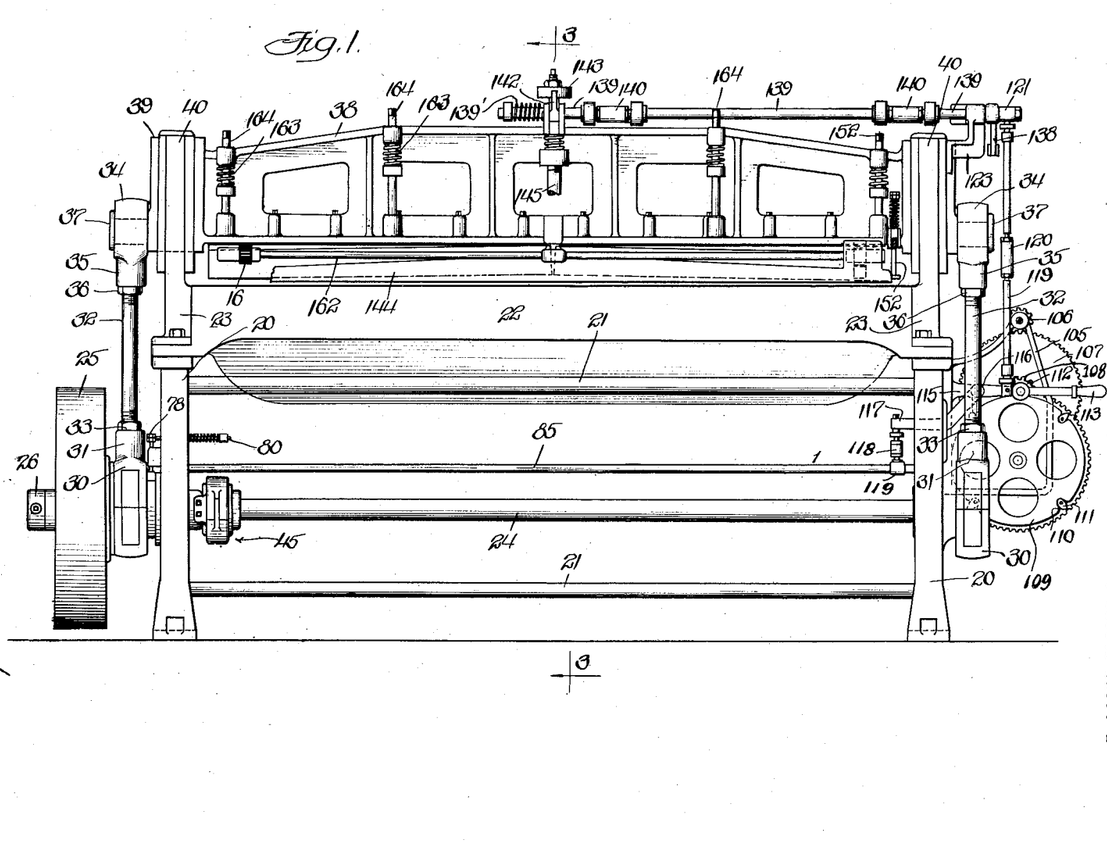
Fig. 1 is a side elevation of the machine.

A collar 26, on the end of the shaft 24, prevents the drive wheel or pulley 25 from moving off the end of the shaft 24. An eccentric 28 is secured to the shaft 24 by a key 29. There is an eccentric near each end of the shaft, as more clearly shown in Fig. 1. Surrounding each eccentric is an eccentric strap 30, terminating in a boss 31 in which is screwed an eccentric rod 32 adjustable as to its effective length and secured by the nut 33.

Each of the eccentric rods, 32, is connected to a bearing block 34, which carries a hollow threaded hub 35 in which the rod 32 is insertable and held in adjusted position by the nut 36. The blocks 34 each engages a bearing 37 that projects outwardly from the knife frame 38. This frame is provided, on each of its ends, with bearings 39 that are reciprocatable in the upper part 40 of the standards 23. Secured to the frame 38 is a longitudinally extending shearing knife 41, held in place by the screws 42. A cooperating knife, or cutting edge 43, is secured to the frame 22 and is vertically adjustable by a series of screws 44.

Figure 3:
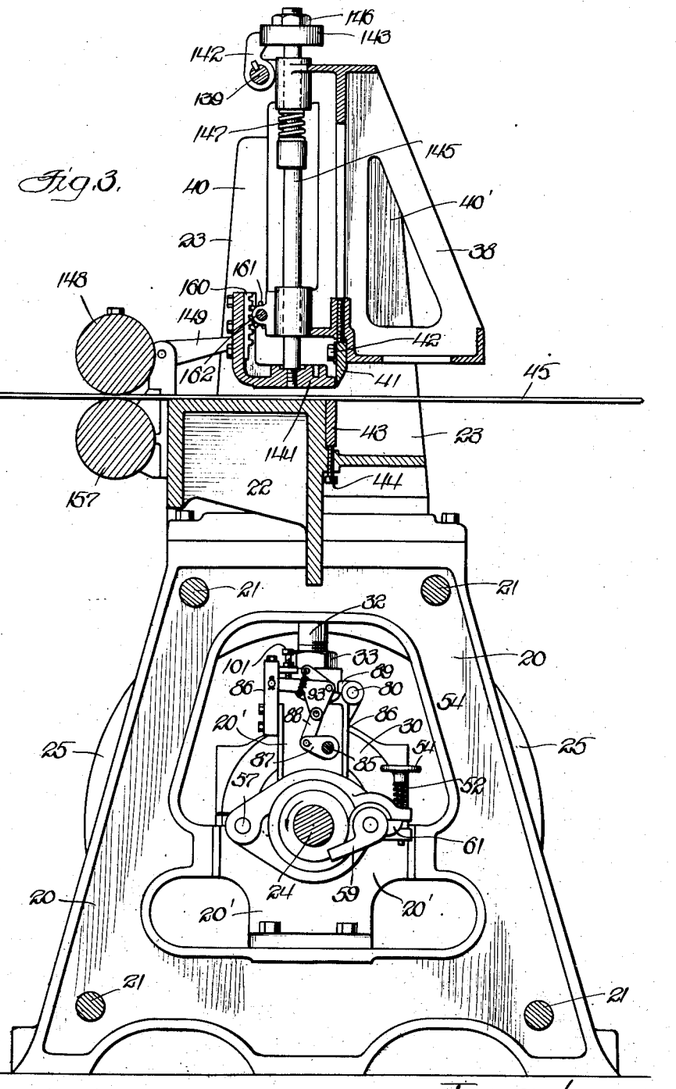
Fig. 3 is a transverse section, taken on line 3—3 of Fig. 1.

In Fig. 3 the knife blades 41 and 43 are shown separated with a sheet 45 between them so that when the knife 41 is brought downwardly past the upper edge of the knife 43, the sheet will be sheared.

Figure 16:
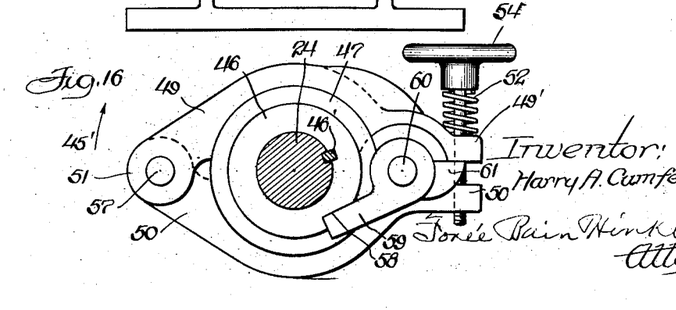
Fig. 16 shows the same device with parts in normal position.
Figure 18:
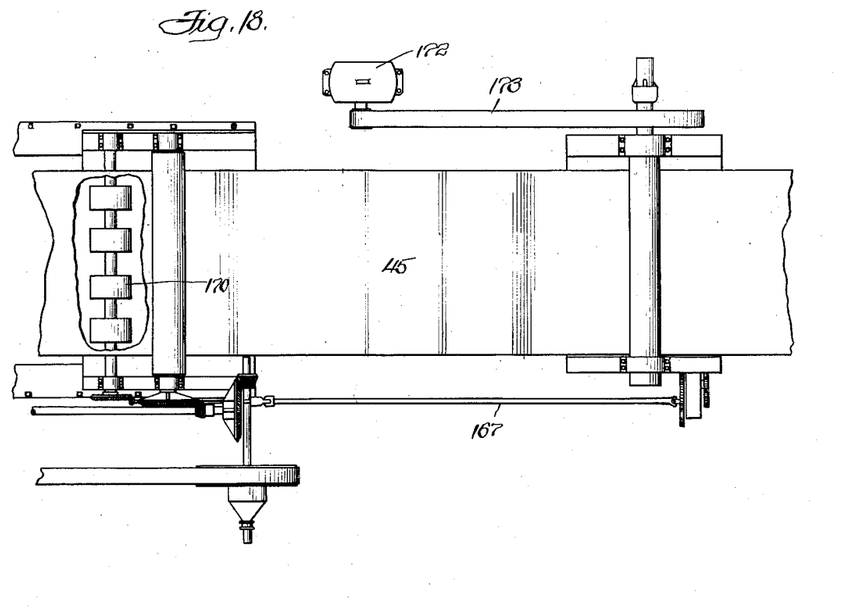
Fig. 18 is a plan view of the knife machine showing it connected in line with a water proofing machine thru which the sheet to be cut passes and connections for the knife controlling means with the sheet measuring means of the water proofing machine.
Figure 19:
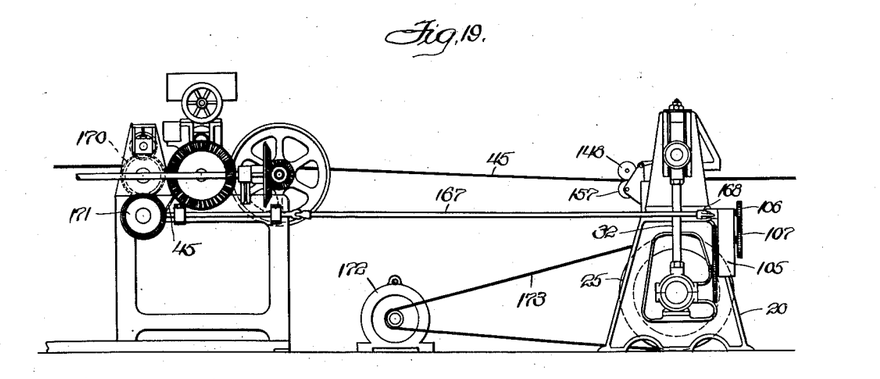
Fig. 19 is an elevation thereof.

The means for preventing the drive shaft 24 from constantly rotating consists of the frictionally clamping device 45′ Fig. 16. Secured to the shaft 24 is a ring 46 having flanges 47 and 48. Between the flanges a pair of friction shoes 49 and 50 are inserted. These shoes are pivotally connected together, as at 51, the other confronting ends 49′ and 50′, respectively, of the shoes, are yieldingly held together by an open helical spring 52 surrounding an adjusting rod 53, which is screw threaded and which carries upon one end the hand wheel 54 for adjusting the tension of the spring.

Secured to the main shaft bearing block 55 is a bracket 56 thru which the pin 57 of the device 45′ passes to prevent the shoes 49 and 50 from being rotated.

Figures 3, 5, 6, 7, 9, 10, 11, 12:
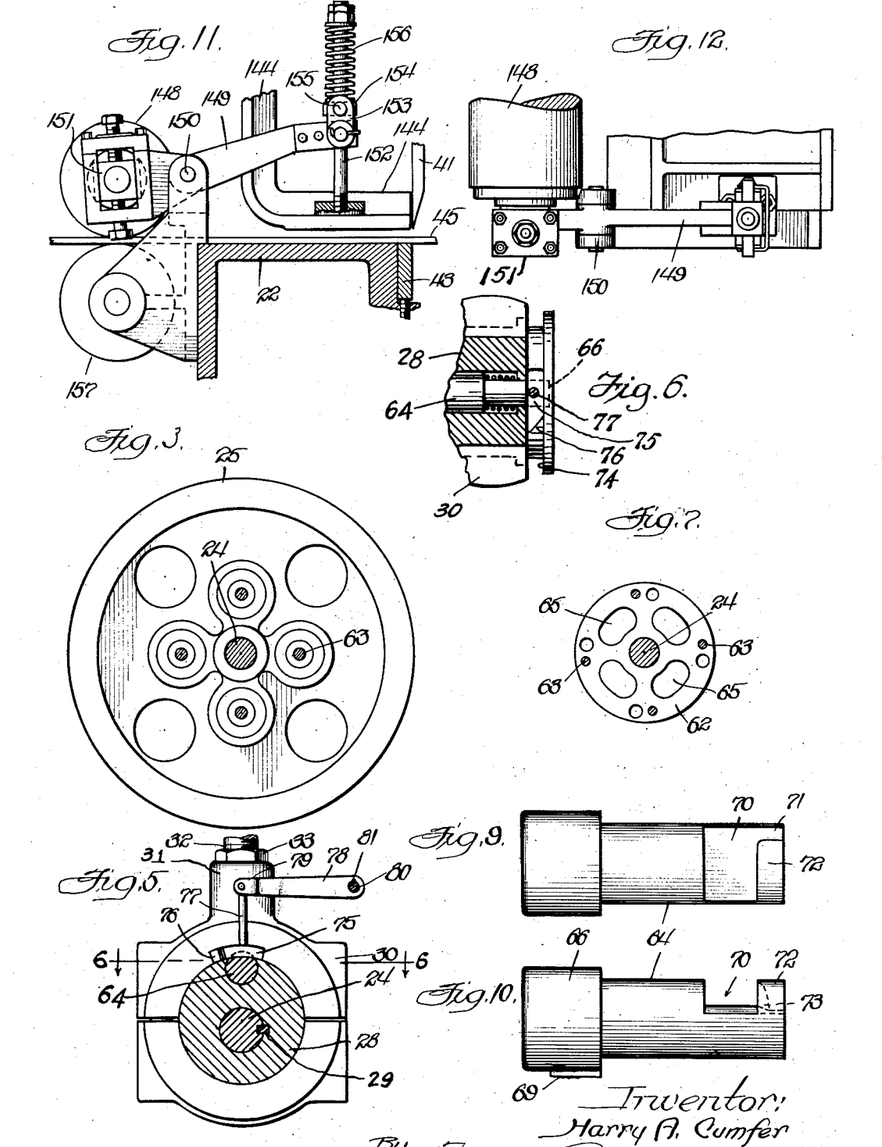
Fig. 5 is a section taken on line 5—5 of Fig. 4.
Fig. 6 is a section taken on line 6—6 of Fig. 5.
Fig. 7 is a section taken on line 7—7 of Fig. 4.
Fig. 9 and Fig. 10 are elevations of the clutch pin in two positions.
Fig. 11 is an enlarged detail of part of the machine for operating the presser foot, as shown in Fig. 3.
Fig. 12 is a plan view of the same.

The ring 46 has a notch 58 in which the pawl 59 normally rests. The pawl 59 is rotatable upon a pin 60 and it is provided with a heel plate 61 which rests between the ends 49′ and 50′ of the shoes. The pin 60 has bearing in the end 50′ of the lower shoe, so that when the pawl is lifted out of the notch 58 by initial rotation of the shaft 24, the heel 61 will pry the ends 49′ and 50′ apart and release the friction on the ring 46, that is secured to the main drive shaft 24, and permit the shaft to turn freely, but the pawl will snap back into the notch 58 after the shaft has made one complete revolution and release the spring 52, and permit it to apply friction on the shoes, and thereby impose abnormal friction upon the shaft which will serve to stop it, after the positive driving means has been disconnected from the shaft. The coupling means for connecting the driving wheel 25 with the shaft 24 consists of a clutch member 62 secured to the wheel 25 by the bolts 63. The member 62 has a series of circumferentially arranged elongated depressions 65 in its face fronting the eccentric structure 30, as more clearly shown in Fig. 7. Slidable in the eccentric 28, near the drive wheel 25, is a headed bolt 64 surrounded by an open compression spring 67 which tends to push the bolt outwardly and cause the headed end 66 to engage one of the depressions 65 in the member 62 and thus connect the drive wheel 25 with the shaft 24. Normally, the headed bolts 66 is positively held in its retracted position against the effect of the spring 67, as more clearly shown in Fig. 4. The bolt 66, as shown in Figs. 9 and 10, is provided with a feather 69 that prevents it from turning, when it is reciprocated for the purpose of locking the parts together. It is also provided with a transverse slot 70 which terminates towards the smaller end of the bolt, at 71, leaving a shoulder 72 which is slightly tapered, as at 73. Normally resting in a groove 74 of the eccentric is a vertically movable dog 75 tapered on one of its ends 76. After the pin 66 has entered one of the slots 65 to connect the drive wheel 25 and the shaft 24 together, then the tapered end 76 of the dog 75 will, at the end of the succeeding revolution, encounter the shoulder 72 on the pin 66 and withdraw it axially from its position in the depression 65, against the operation of the spring 67 and permit the fly wheel or drive wheel 25 to rotate continuously without rotating the shaft 24. Just about the time that the pin 66 is withdrawn from the depression in the member 65 the dog 59, of the frictional device shown more clearly in Fig. 16, snaps back into the notch 58 on the ring 46 by pressure of the spring 52 on the heel 61, and causes the spring 52 to yieldingly force the shoes 49 and 50 into contact with the ring 46, thereby applying the friction to overcome the momentum of the shaft 24 and its rotatable connected parts, and to hold the same in definite positions.

Figure 4:
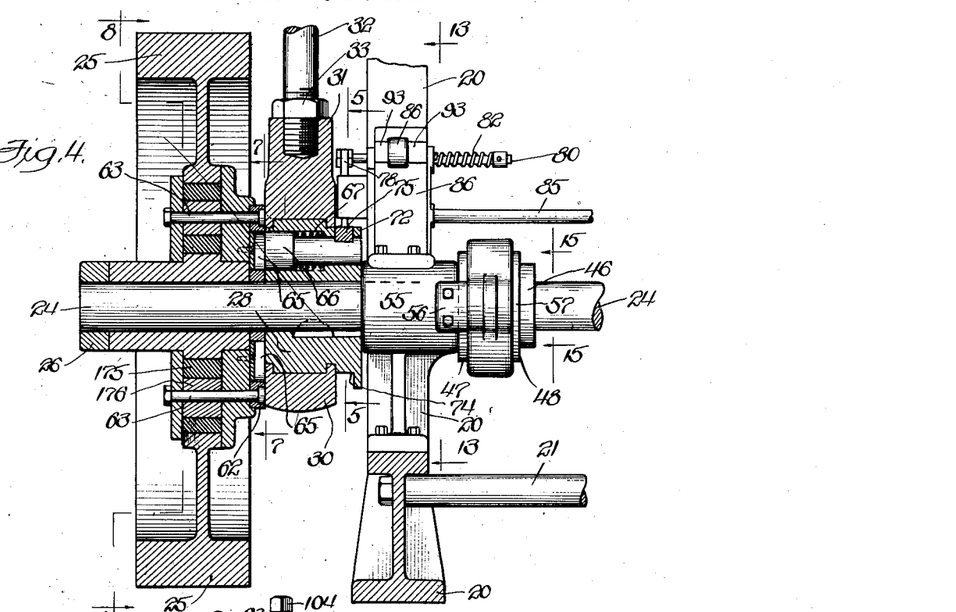
Fig. 4 is an enlarged vertical section of part of the driving end of the machine.

In order that the sudden stopping of the shaft may not impart a violent shock to the mechanism, I provide a shock absorbing device, more clearly shown in Fig. 4 in which each of the bolts 63 which hold a clutch member to the power wheel 25 are surrounded by a soft rubber ring 175 enclosing a sleeve 176 whereby to provide a yielding driving connection by which the wheel 25 is more gradually started and stopped.

The dog 75 has a stem 77 pivoted to the lever 78, as at 79. The lever is connected to the shaft 80 by a key 81. Surrounding the shaft 80 (Fig. 4) is a spiral spring 82 which tends to rotate the shaft and hold the dog 75 in the groove 74 in the path of the bolt to withdraw the latch-bolt 64 from the depression 65 at each revolution of the shaft.

The dog 75 is moved vertically out of the path of the reciprocating latch-bolt 66, momentarily, by the mechanism now to be described.

Figures 12, 14, 15, 17:
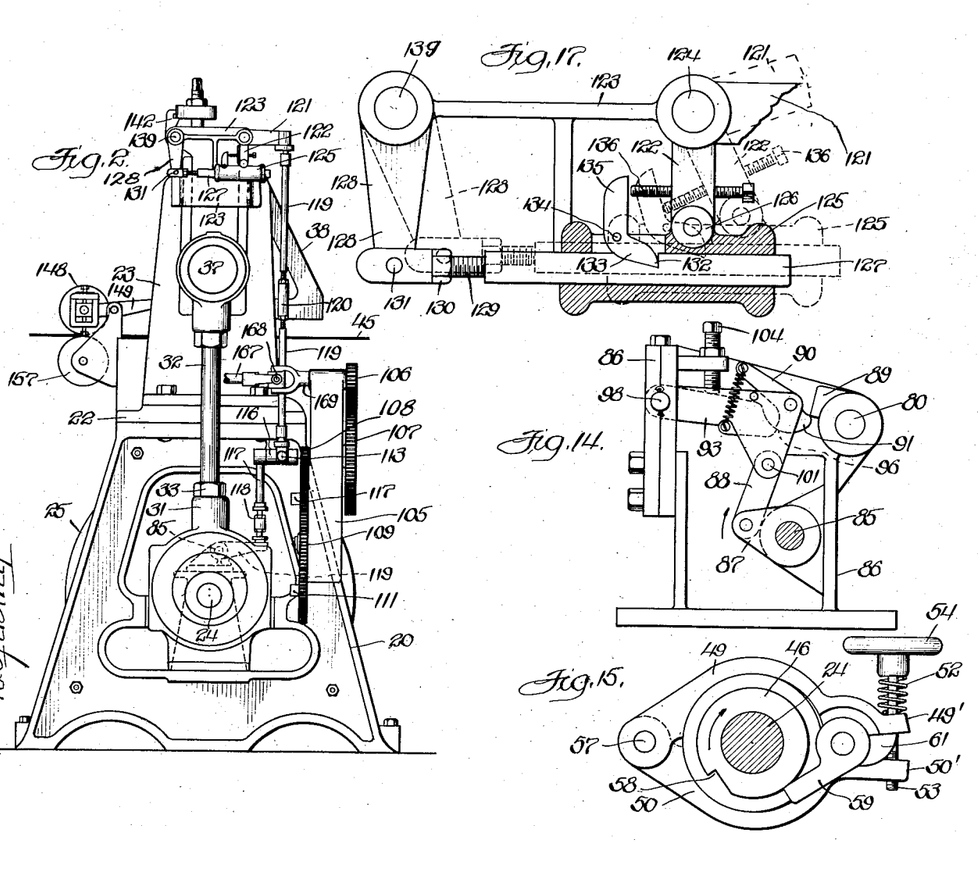
Fig. 14 shows the same device in a different position.
Fig. 15 is a section taken on line 15—15 of Fig. 4, showing one position.
Fig. 17 is an enlarged elevation of the knife supports.
Figure 13:
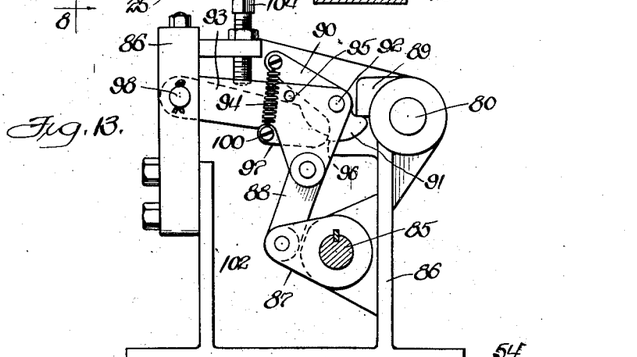
Fig. 13 is a section taken on line 13—13 of Fig. 4, in one position.

An oscillatable shaft 85 (Figs. 1, 13 and 14) extends horizontally between the frame members 20—20, parallel with the driving shaft 24 and finds bearing in the bracket 86 that is secured to the frame member 20' on the driving end of the machine. The spring rotated shaft 80 also finds bearing in the said bracket and on its end, beyond the bracket, it carries the arm 78 that lifts the dog 75. Secured to the shaft 85 is a crank arm 87 which carries a pivoted link 88. The shaft 80 carries a detent 89 which, with the arms 78, is yieldingly held in position by the spring 82. A pivoted dog 90 is provided with a nose 91 which normally rests under the end of the detent 89 and it is pivoted at 92 to a pair of swinging link members 93. The dog 90 is yieldingly held in position shown in Fig. 13 by the spring 94 which yieldingly holds the dog against a stop 95 on the swinging link member 93. The dog 90 is provided with an abrupt rear shoulder 96 which normally engages an arm 97 that is pivoted, as at 98, to the bracket 86. The spring 94 is connected to the pivoted arm 97 as at 100. The link 88 is pivoted to the swinging link member 93, at 101. Now, when the shaft 85 is moved to the right, as shown in Fig. 13, the link 88 will raise the swinging link members 93 until the arm 97 encounters the lower end of the adjusting screw 104, whereupon the arm 93 will be arrested and the dog 90 will continue upwardly until its nose 91 is disengaged from the detent 89, as more clearly shown in Fig. 14. As the detent 89 is thus rotated against the operation of the spring 82 the dog 75 will be lifted from the groove 94 and thus release the latch-bolt 96, and lock the clutch members together. Immediately after the nose 91, of the dog 90, slips from under the end of the detent 89 the spring 82 will return the parts to their normal position, so that the dog 75 will be in place to engage the latch pin 66 upon the completion of one revolution of the shaft 24. The arrangement is such that the dog 75 cannot be retained from its position after the shaft 85 has been moved the full gamut of its excursion.

The means for oscillating the shaft 85 will now be described.

Secured to the frame member 20 (Figs. 1 and 2) is a bracket 105 carrying a train of gears consisting of a pinion 106 meshing with an intermediate gear 107 which is mounted upon a shaft carrying a pinion 108, and which in turn is in mesh with another intermediate gear 109. The gear 109 is a timing gear or wheel, for measuring the length of the sheet to be cut from the moving sheet. The measuring or timing mechanism is more particularly described and claimed in my copending application Serial No. 508,229; filed October 17, 1921.

The gear wheel 109 is provided with replaceable lugs 111 that extend beyond the periphery of the gear wheel for engagement with the roller 112 for lifting the lever 113. The lever 113 is pivoted to a fixed part 115 of the bracket 105, as at 116. There is an extended downwardly directed end 117 extending inwardly from the pivoted point 116, of the lever 113, and, carried on the end of the lever part 117 is a turn buckle 118 for effectively adjusting its length. The end of the turn buckle 118 normally bears on an arm 119 which is fixed to the shaft 85.

Now, from the foregoing description it will be manifest that, when the lever 113 is raised, either by the lug 111, or by hand, the shaft 85 will be oscillated in such a manner as to cause connection between the drive wheel 25 and the shaft 24, in the manner heretofore described.

Pivoted to the lever 113, just in the rear of the roller 112, is a vertically extending rod 119, having a turn buckle 120 for adjusting its effective length. The upper end of the rod 119 bears under the outer free end of the arm 121 (Figs. 2 and 17). Secured to the arm 121 is a swinging link 122 and the arm and link are pivoted to the bracket 123, at 124. The link 122 is also pivoted to a swinging sleeve 125 at 126.

A rod 127 is reciprocatable in the sleeve 125 and at one end it is pivotally connected to a swinging link 128. A screw threaded portion 129 with a nut 130 is a means by which to adjust the effective length of the rod between the pivotal point 131 and the notch 132.

A dog 133 normally rests in the notch and is pivoted to the sleeve 125 at 134. It has an upwardly extending end 135 for contact with an adjusting screw 136 which is threaded in the arm 122. Swinging arm 128 is fixed to the shaft 139. When the arm 121 is raised to dotted line position, by the detent 111 on the wheel 109 encountering the roller 112 of the lever 113, the swinging arms 122 and 128 are moved into dotted line positions shown in Fig. 17 thereby oscillating the shaft 139. The shaft 139 is provided with universal joints 140 which connect the sections of the shaft together. These are used to accommodate the vertical movement of the knife frame 38. The outer end of the shaft 139 carries a latch dog 142 having a shoulder that normally rests under a projection 143 (Fig. 3) secured to the upper end of the rod 145 by a nut 146. When the part 143 is released by the dog 142 the spring 147, which surrounds the upper end of the vertical rod 145, will push the presser foot 144 downwardly upon the sheet 45 that rests therebelow. As the presser foot 144 makes contact with the sheet 45 the progress of the sheet is arrested, and the roll 148, which normally rests upon the sheet 45 is lifted by the lever 149 which is pivoted at 150 and which supports the bearing block 151 of the roll. The outer end of the lever is secured to a rod 152, there being one rod near each end of the roll so that both ends of the roll 148 are lifted at the same time. The lifting of the roll 148 from its normal position allows the sheet 45 to buckle, to some extent, to compensate for the short time it has been stopped in its movement by the presser foot 144 resting thereon.

The arm 149 is connected to a link 153 and link 153 is pivoted to a collar 154, as at 155. The spring 156, around the rod 152, bears against the collar 154, which is loose on the rod, and takes the shock due to the sudden downward movement of the presser foot 144 in lifting the roll 148. The roll 157 below the roll 148 cooperates therewith to hold the sheet 45 straight and without wrinkles in its presentation to the knife.

About the time that the presser foot 144 is unlatched in the manner described, the spring 147 causes the presser foot to descend until its rests immediately on the sheet 45 before the eccentrics 28 have made one-half revolution to bring the edges of the knives 41 and 43 together. Before the one-half revolution is made, however, these edges come in contact to sever the sheet and the knife 41 is then further moved downwardly, during the first half revolution of the eccentrics until the dog 142 will again latch under the projection 143, the springs 163 being compressed to permit the required relative movement between the presser foot and the knife frame, so that when the complete revolution is made by the eccentrics the presser foot is raised thereby during the second half of the revolution.

That the ends of the presser foot may travel in parallel lines, I provide a rack 160 at each end of the presser foot 144 and in the rack is a pinion 161 secured to a shaft 162 which connects the pinions together. When the rod 119 is moved downwardly, after the detent 111 has passed from under the roller 112, the spring 139' will rotate the shaft 139 and move the parts, shown in Fig. 17, back to full line position, as shown in Fig. 2.

When the knife blade 38 is in its most downward position and the knife 41 passes beyond the edge of the lower knife 43 the spring 163, around the rod 164, will be depressed to permit excessive movement referred to. Thereupon the latching dog 142 will engage the projection 143 and the presser foot will be lifted with the frame 38 by the operation of the eccentric at each end of the driving shaft 24.

The train of gearing for initiating the operation of the knife and the presser foot is driven by a shaft 167 thru a universal joint 168, which connects the shaft to a short shaft 169 upon which the pinion 106 is mounted. The shaft 167 may be driven in timed relation with the movement of the strip 45 by rolls 170 and 171 of another machine or by any suitable means for determining the movement of the sheet 45.

The knife and the mechanism connected thereto may be driven by a separate motor 172 thru a belt 173, or the like.

It will be observed that the knife and presser foot can be operated only after the lever 113 has been moved and not again until these parts have been returned to normal position and the lever again moved for the purpose.

While I have herein shown a single embodiment of my invention for the purpose of clear disclosure, it will be manifest to persons skilled in the art that many changes may be made in the general arrangement and configuration of the parts within the scope of the appended claims.

Having described my invention what I claim as new and desire to secure by Letters Patent, is:—

1. A machine of the character described comprising a machine frame; a power drive shaft journaled therein; a knife frame vertically reciprocatable thereon; a shearing knife carried by the knife frame; a cooperating fixed knife carried by the machine frame; an eccentric on each end of the drive shaft connected to the respective ends of the knife frame; a presser foot supported upon the knife frame; a spring, when released, to move the presser foot towards the fixed knife; means to potentiate the spring and to latch the presser foot to the knife frame; means to drive the power shaft; a clutch to connect said shaft thereto and means to initiate operation of the clutch and to unlatch the presser foot to cause the latter to move ahead of the knife.

2. A machine as characterized in claim 1 in which excessive movement of the knife frame towards the fixed knife operates the latch to engage the presser foot with the knife frame to return the presser foot to its normal position.

3. A machine as characterized in claim 1 in which the eccentrics move the knife frame in both directions and return the presser foot to normal position after the spring has initially moved the presser foot to operative position.

4. A machine for cutting a continuously moving sheet into sections of equal length comprising a reciprocatable knife frame; a knife carried thereby; a spring-pressed presser foot carried by the knife frame; a latch to hold the presser foot in retracted position on said frame; a drive shaft to reciprocate the knife frame; means to drive the shaft; a clutch for connecting the driving means to the shaft to rotate the latter one revolution; means controlled by movement of the sheet to unlatch the presser foot and to connect the clutch members and means to disconnect the clutch members when the shaft has made one revolution.

5. A machine as characterized in claim 4 in which a yielding means is provided to absorb the shock due to the sudden application of power to the parts to be moved.

6. A machine as characterized in claim 4 in which a hand operated means for initiating the movement of the knife is also provided, supplemental to the automatic means.

7. A machine as characterized in claim 4 in which one source of power moves the knife and presser foot to operative positions and another source of power operates means controlling the said moving means.

8. A machine of the character described providing a machine frame; a knife frame reciprocatable thereon; a knife carried by the knife frame; a cooperating fixed knife carried by the machine frame; a presser foot supported on the knife frame; means on the knife frame to hold the presser foot yieldingly on the machine frame when the said knife frame is depressed; means to latch the presser foot to the knife frame when in depressed position and means to return the parts thus latched together to normal posistions.

9. A machine of the character described comprising a reciprocatable knife; means to reciprocate the knife; a presser foot movable by means independent of the knife moving means; actuating means to control the knife moving means and means controlled by a sheet passing thru said machine to initiate movement of the knife and presser foot.

10. A machine of the character described comprising a reciprocatable knife, means to reciprocate the knife; a presser foot; springs to move the presser foot in one direction; a latch to restrain the springs; means to unlatch the preser foot to permit the springs to move it; means to initiate movement of the knife and means to coincidentally raise the knife and presser foot to latched position.

11. A machine of the character described comprising a reciprocatable knife and presser foot; means potentiated by raising the presser foot to move the presser foot in its downward movement; a latch to hold the presser foot up and means operable by another machine to initiate the downward movement of the knife and presser foot.

In testimony whereof I hereunto subscribe my name.

HARRY A. CUMFER.